US006311103B1

(12) United States Patent
Hart et al.

(10) Patent No.: US 6,311,103 B1
(45) Date of Patent: Oct. 30, 2001

(54) METHOD FOR RUN-TIME PERFORMANCE TUNING OF AN INSERTER SYSTEM

(75) Inventors: William G. Hart, Sandy Hook; Eugene Pritchard, Brookfield; Michael Shea, Litchfield, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/458,418

(22) Filed: Dec. 10, 1999

(51) Int. Cl.[7] ........ G06F 7/00
(52) U.S. Cl. ........ 700/220; 700/219
(58) Field of Search ........ 700/219, 220, 700/223, 228; 270/58.06, 58.02

(56) References Cited

U.S. PATENT DOCUMENTS

| | | | |
|---|---|---|---|
| 3,484,100 | 12/1969 | Sather et al. | 270/58 |
| 4,194,685 | 3/1980 | Hill et al. | 235/375 |
| 4,381,447 | 4/1983 | Horvath et al. | 250/223 |
| 4,790,119 | 12/1988 | McDaniels | 53/411 |
| 4,797,830 | 1/1989 | Baggarly et al. | 364/464.03 |
| 4,800,505 | 1/1989 | Axelrod et al. | 364/478 |
| 4,987,547 | 1/1991 | Rabindran et al. | 364/478 |
| 5,220,770 | 6/1993 | Szewczyk et al. | 53/493 |
| 5,317,654 | 5/1994 | Perry et al. | 382/61 |
| 5,359,544 * | 10/1994 | Suwahara | 364/471 |
| 5,467,434 | 11/1995 | Hower, Jr. et al. | 395/114 |
| 5,493,106 | 2/1996 | Hunter | 235/375 |
| 5,618,037 | 4/1997 | Chang et al. | 271/258.02 |
| 5,659,481 | 8/1997 | Qutub et al. | 364/478.08 |
| 5,710,874 | 1/1998 | Bergen | 395/115 |
| 5,730,299 | 3/1998 | Helsley | 209/584 |
| 5,768,132 | 6/1998 | Cordery et al. | 364/464.14 |
| 5,798,930 | 8/1998 | van Oosten | 364/478.01 |
| 5,816,715 | 10/1998 | Harman et al. | 400/71 |
| 5,818,724 | 10/1998 | Brewster, Jr. et al. | 364/478.08 |
| 5,826,869 | 10/1998 | Nyffenegger et al. | 270/52.02 |

* cited by examiner

*Primary Examiner*—Christopher P. Ellis
*Assistant Examiner*—Khoi H. Tran
(74) *Attorney, Agent, or Firm*—Michael J. Cummings; Michael E. Melton

(57) ABSTRACT

A method and system for preparing mailpieces. A inserter system for assembling mailpieces in a mailing job is controlled in accordance with a measure of the fraction of chassis cycles which are empty. The chassis speed is continually adjusted during run-time for a mailing job to minimize the number of "dry holes", i.e. the fraction of chassis cycles which do not contain a mailpiece.

14 Claims, 3 Drawing Sheets

METHOD FOR RUN-TIME PERFORMANCE TUNING OF AN INSERTER SYSTEM

BACKGROUND OF THE INVENTION

This invention relates to the preparation of large mailings and the like. More particularly it relates to systems and apparatus for the preparation of documents and the assembly of multiple mailpieces including such documents.

The term "mailpieces" as used herein means items intended to be delivered by a postal service or private courier service. Typically preparation of mailpieces includes, but is not limited to, printing or otherwise providing documents including variable information pertaining to addressees of the mailpieces and the assembly of such documents with other elements of the mailpiece. The term "assembly" as used herein means the execution of actions to incorporate the documents into mailpieces. Typically, such actions can include: accumulating documents with other materials such as preprinted inserts, folding and inserting the resulting accumulations into envelopes, printing addresses and other information on the outside of the envelopes, and franking the mailpiece with an appropriate postage amount.

Inserter systems for the assembly of mailpieces are well known. Typically such systems will comprise a document feeder for providing accumulations of documents and a plurality of stations (hereinafter sometimes a "chassis") for carrying out assembly operations with such accumulations to form mailpieces. The chassis will operate cyclically, at a constant speed with accumulations advancing to the next station at fixed intervals at the end of each cycle. The document feeder will also operate at a fixed speed but will provide accumulations to the chassis at varying intervals since the number of sheets in each accumulation will vary. The general operation of such inserter systems is well known and is described, for example, in commonly assigned, co-pending U.S. application Ser. No.: 09/124,501; titled: System, Method and Apparatus for Preparation of Mailpieces; filed: Jul. 29, 1988. Except as is set forth below by way of illustration of preferred embodiments of the subject invention a more detailed description of the operation of such inserter systems is not necessary to an understanding of the subject invention.

While systems such as those described above have proven highly successful certain disadvantages remain. In particular the fact that chassis cycle at fixed intervals while documents are delivered at varying intervals means that a potential exists that no documents will be available for a particular cycle. Clearly the possibility of such "dry holes" can be eliminated simply by operating the chassis slowly enough to assure that the maximum number of sheets can be accumulated in one cycle but, equally clearly, operating at that minimal speed will be highly inefficient in the general case where relatively few accumulations with a maximum number of sheets are expected. Conversely, in mailing jobs having a relatively large number of large accumulations, running too fast will cause a large number of dry holes and a higher throughput is achieved by operating the chassis at a slower speed. This problem is exacerbated by the fact that accumulation size will vary with within mailing jobs.

Heretofore efforts to improve the operating efficiency of inserter systems have not addressed this problem in a direct, simple and cost effective manner. Thus, U.S. Pat. Nos. 4,987,547 and 5,083,281; to: Rabindran et al. teach a method for optimizing system speed to minimize time lost to jams and stoppages; while U.S. Pat. No. 5,826,869; to: Nyffenegger teaches a non-standard, buffered, variable speed document feeder which it is believed would substantially add to the cost and complexity of an inserter system.

Thus it is an object of the subject invention to provide a simple, cost-effective method for tuning the performance of an inserter system during the run-time of a mailing job.

BRIEF SUMMARY OF THE INVENTION

The above object is achieved and the disadvantages of the prior art are overcome in accordance with the subject invention by means of method for preparing mailpieces and an inserter system controlled in accordance with that method. The inserter system includes a chassis for assembling mailpieces, the chassis operating cyclically with successive accumulations advancing at the end of each cycle, and a document feeder for feeding accumulations of documents to the chassis, the accumulations containing varying numbers of documents the document feeder operates at a fixed linear speed, so that accumulations are available for input to the chassis at varying intervals substantially depending upon the number of documents in corresponding accumulations. Thus there is a possibility that no accumulation will be available for particular cycles of the chassis. Initially the chassis operates at a selected speed. Periodically a measure of the fraction of the cycles for which one of the accumulations is available is determined and compared to a selected value. If the comparison indicates that the fraction is too low the chassis speed is decreased; and if the fraction is too high the chassis speed is increased.

In accordance with one aspect of the subject invention, the chassis speed is increased or decreased by a predetermined fixed amount.

In accordance with another aspect of the subject invention, the fixed amount is a predetermined function of a system parameter.

In accordance with another aspect of the subject invention, the measure is the average difference, over a selected number of cycles, between the time one of the accumulations is input to the chassis and the time the chassis requested input, and the value is a selected time value.

In accordance with another aspect of the subject invention, during each of the cycles one of the accumulations can be input to the chassis during a window and the time value is selected to be slightly less than the duration of the window.

In accordance with still another aspect of the subject invention, the fraction is measured directly.

In accordance with another aspect of the subject invention, the value is a percentage slightly less than 100 percent.

Other objects and advantages of the subject invention will be apparent to those skilled in the art from consideration of the attached drawings and the detailed description set forth below.

DETAILED DESCRIPTION OF PREFERRED EMBODIMENTS OF THE SUBJECT INVENTION

Figure 1:
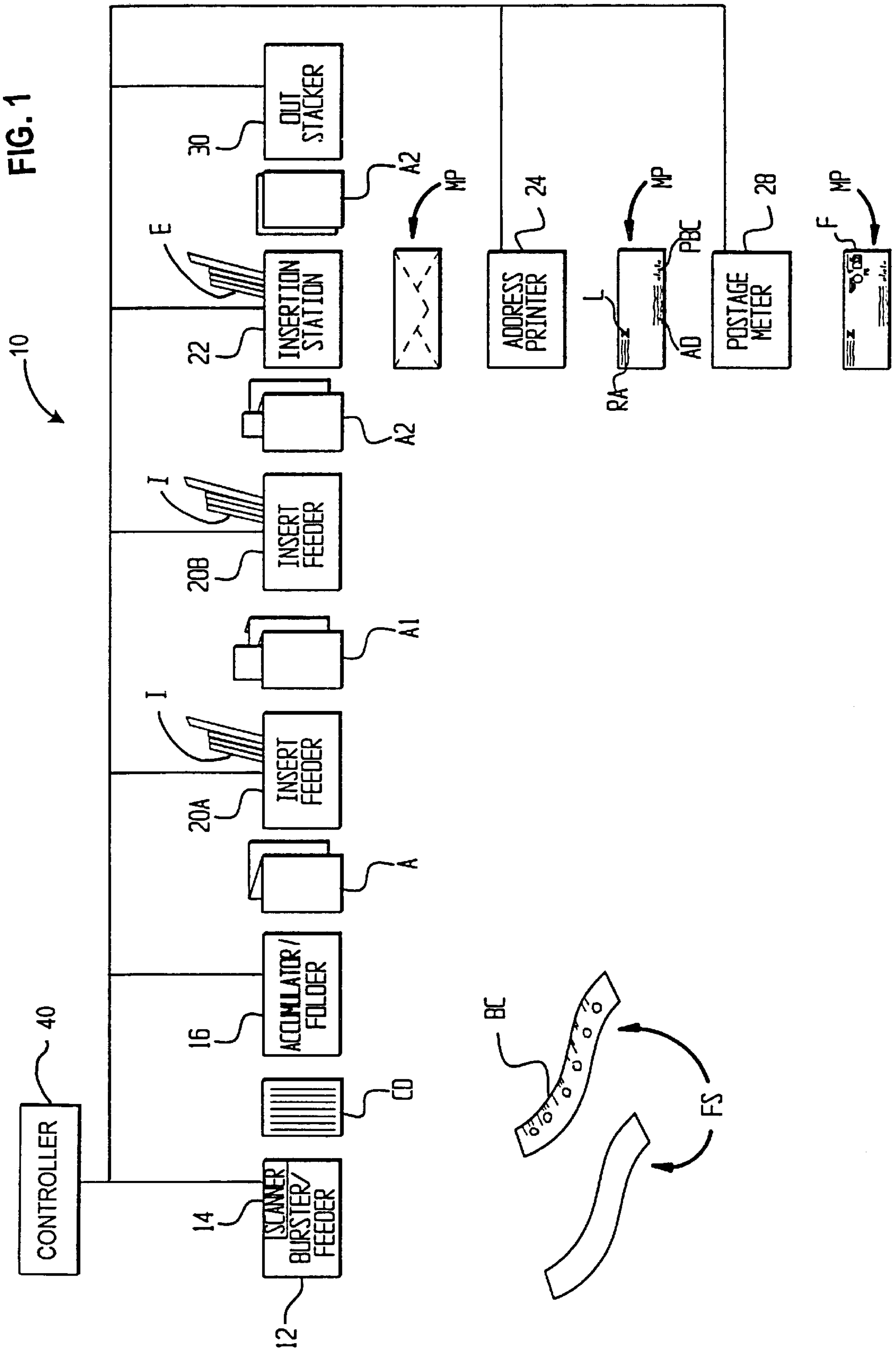
FIG. 1 shows a schematic block diagram of an inserter system.

A inserter system is shown in FIG. 1. Inserter system 10 includes burster/feeder 12 which inputs preprinted documents in fanfold form, separates the documents and removes and discards sprocket feed strips FS from the edges of the document. Each group of documents for a particular mailpiece includes at least control document CD. On control documents CD strips FS are marked with code BC which is read by scanner 14 before strips FS are removed. In simpler systems code BC can be a "dash code" of the type known for use in directly controlling inserter systems. In newer, more complex systems code BC can be a conventional bar code which serves as a pointer to a mailpiece record which record contains information for controlling the inserter; as will be more fully described below. In other known inserter systems, the documents can be in cut sheet form and a cut sheet feeder can be used in place of burster/feeder 12.

Control document CD, and any additional associated pages are fed from burster feeder 12 to accumulator 16 where documents for each mailpiece are formed into separate accumulations A and folded. Together burster/feeder 12 and accumulator/folder 16 form a document feeder.

Accumulation A is then fed to insert stations 20A and 20B where preprinted inserts I are added to form accumulations A1 and A2. Those skilled in the art will of course recognize that the number of such insert stations used will vary from application to application.

Accumulation A2 is then fed to insert station 22 where it is inserted into an envelope and sealed to form mailpiece MP.

Mailpiece MP is then fed to address printer 24 which prints address AD on the outside of the envelope. Depending on the size of the print field of printer 24, printer 24 also can be used to print other information such as a variable return address (or other text message) RA, logo L, and postal barcode PBC on the envelope. (Those skilled in the art will recognize that dash codes as described above typically cannot include sufficient information to define even address AD so that systems incorporating dash codes typically use window envelopes to provide addressing information.)

Control document CD, and any additional associated pages are fed from burster feeder 12 to accumulator 16 where documents for each mailpiece are formed into separate accumulations A and folded.

System 10 also includes out stacker 30 for diverting mailpieces when an error is detected.

As noted above inserter systems wherein the code BC is a barcode which is used as a pointer to a mailpiece record (i.e. an electronic record associated with a mailpiece to be assembled) are known. By incorporating data for controlling assembly of mailpieces in mailpiece records an essentially unlimited amount of data can be associated with each mailpiece. Thus addresses, return addresses, logos, and postal bar codes can all readily specified in addition to specification of the number of inserts to be added at each insert feeder, postage amounts, etc. Systems incorporating such mailpiece records are described in commonly assigned U.S. Pat. No. 4,800,505; to: Axelrod et al.; for: Mail Preparation System; issued Jan. 24, 1989, which is hereby incorporated by reference. Embodiments of the system of U.S. Pat. No. 4,800,505 are marketed by the assignee of the present application under the name "Direct Connection", described in The Direct Connection, version 1.30.

Once a mailing job is set up the run time operation of system 10 is controlled by controller 40 in a known manner to assemble the document accumulations with the proper inserts, insert the documents and inserts into an envelope, and properly address and frank the assembled mailpiece. In accordance with the subject invention controller 40 also periodically determines a measure of the fraction of dry holes currently being processed by system 10 and adjusts the chassis speed to optimize this fraction.

Figure 2:
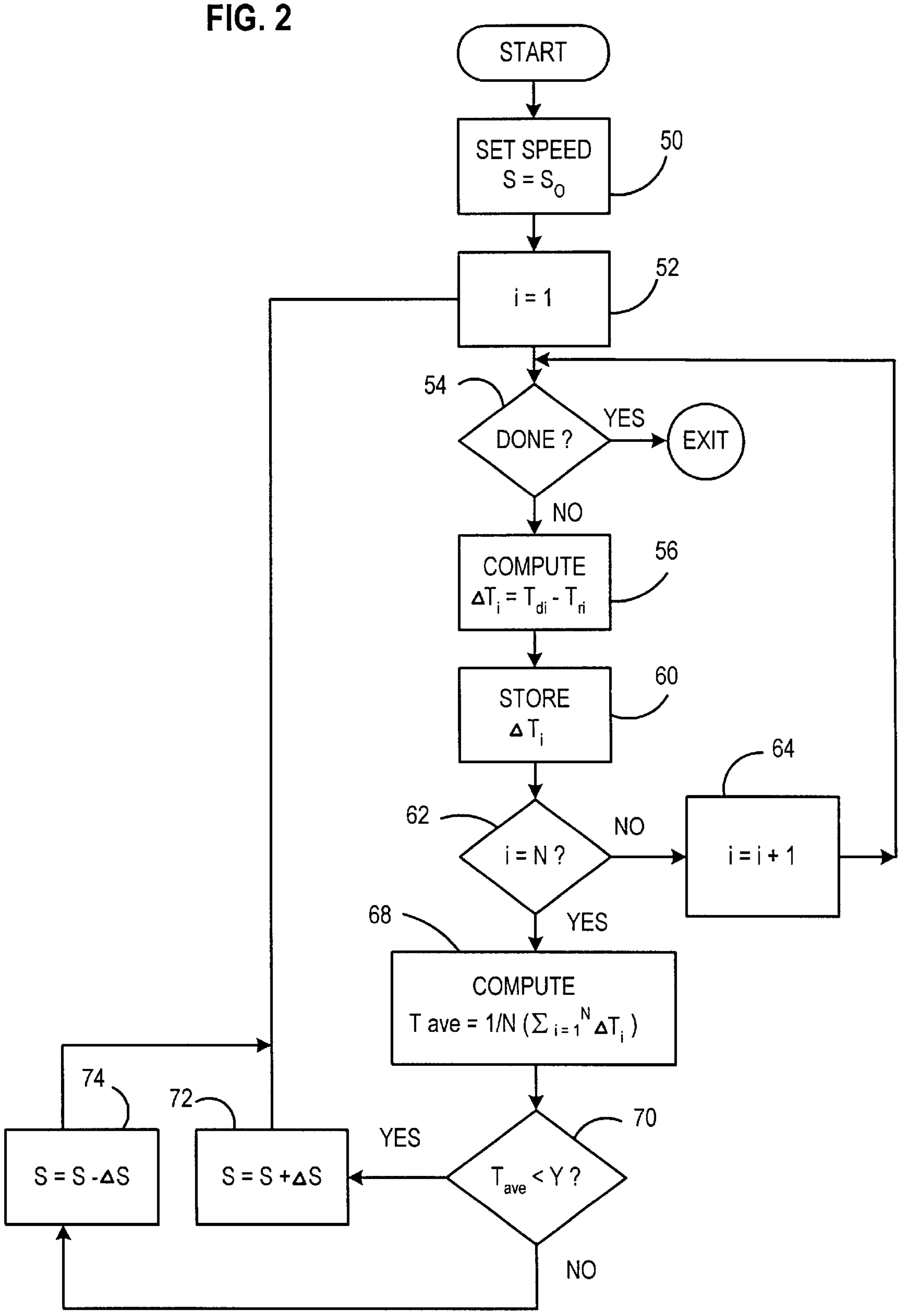
FIG. 2 shows a flow diagram of the operation of the system of FIG. 1 in accordance with the subject invention.

FIG. 2 shows a flow diagram of the operation of controller 40 in accordance with a preferred embodiment of the subject invention. At 50 controller 30 sets an initial chassis speed $S_0$ which can be a fixed value or can be based on estimates of the job characteristics.

(As noted above the document feeder operates at a fixed speed, but delivers accumulations of documents at varying intervals. Linear speeds in document feeders are in general much higher than in chassis and can be set so that, for the typical mailpiece, the document accumulation will be available for the next chassis slot. By running at a constant speed the subject invention takes the fullest advantage of this capability while adjusting chassis speed, as will be described below, to accommodate temporary increases in the average number of sheets in a document. The subject invention is also advantageous in that the document feeder can be more easily tuned for optimal paper handling when it runs at a fixed linear speed.)

At 52 controller 30 sets an index i equal to 1, and at 54 tests to determine if the mailing job is done. If so controller 40 exits. Otherwise at 56 controller 40 computes $\Delta T_i = T_{di} - T_{ri}$ for the with chassis cycle; where $T_{di}$ is the time at which he accumulation is delivered from the document feeder and $T_{ri}$ is the time at which the document is requested by the chassis. The at 60 controller 40 stores $\Delta T_i$.

At 62 controller 49 test if i=N, and, if not, at 64 sets i=I+1 and returns to step 54.

Otherwise, at 68 controller 40 computes $T_{ave}=1/N(\Sigma_{i=1}^{N}\Delta T_i)$, i.e. the average value of $\Delta T_i$ for a sample of N consecutive cycles. Then at 70 tests to determine if $T_{ave}$ is less then Y, where Y is a predetermined constant time value selected as will be described farther below.

If $T_{ave}$ is less then Y then at 72 S is set equal to S+ΔS, and otherwise, at 74 is set equal to S−ΔS, where ΔS is a constant, positive speed value. ΔS can be either a program constant or can be a constant function of a system parameter for various systems, for example a constant fraction of the maximum system speed. Preferably ΔS will be selected to be of moderate size. Too small a value will make it difficult for the system to reach an optimal speed, while too large a value will impose unnecessary stress on the system.

Values for the number of cycles sampled, N and Y, can easily be determined by a person skilled in the art by experimentation. Values of N which are too small will cause the chassis speed to vary too frequently increasing the wear on the system and increasing the likelihood of jams. Large values of N will mean that the speed changes slowly, but will be less than optimal if the size of document accumulations varies quickly in comparison. While difficult to quantify these factors can readily be balanced by person skilled in the art with no more than a minor amount of experimentation.

Figure 3A:
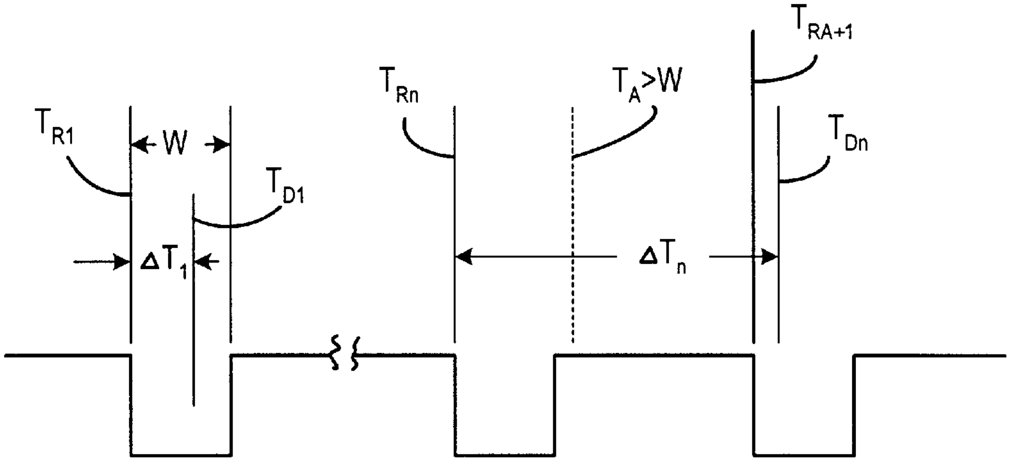
FIGS. 3A, and 3B show timing diagrams which illustrate how the method of the subject invention optimizes the operation of an inserter system.
Figure 3B:
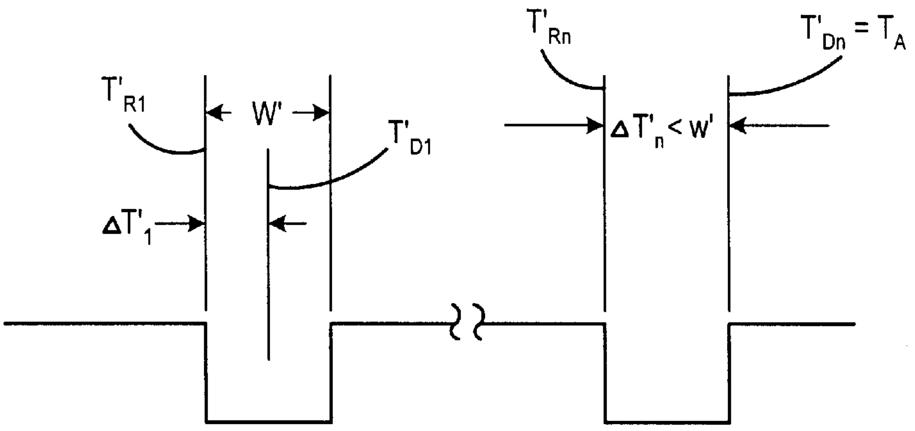

FIGS. 3A and 3B show timing diagrams of the cyclic operation of the chassis of system 10. Each cycle can be considered to begin at a time $T_R$ when the chassis requests a document accumulation from the document feeder. Time $T_R$ is followed by a window having a duration W during which the accumulation can be accepted; thereafter for the remainder of the cycle all stations are in motion as accumulations move to the next station in synchronism, and accumulations cannot be accepted. Note that the value Y is preferably chosen to be slightly less than the initial or nominal value W. Appropriate values for Y will be readily apparent to those skilled in the art since, as will be apparent from the description set forth below, values which are too much less than W will cause the system to operate too slowly for any size accumulation; in extreme cases coming to a halt.

In FIG. 3A, in the first cycle the document accumulation is requested at time $T_{R1}$ and delivered at time $T_{D1}$, so that $\Delta T_1$ is clearly less than W (and Y). Later in the nth cycle a large accumulation is not available until time $T_A$>W. As a result the accumulation is not delivered until $T_{Dn}$ in the next cycle.

It is apparent that any substantial number of empty cycles will cause $T_{ave}$>Y and the program of FIG. 2 described above to decrease the speed of the chassis by ΔS. FIG. 3B thus shows, for purposes of illustration, the same sequence of mailpieces is shown to be processed at a slower chassis speed, S−ΔS. W'>W and in the first cycle $\Delta T_1'=\Delta T_1$. Y of course remains constant. In the nth cycle $T'_{Dn}=T_A$ with the result that $\Delta T_n'$<W' (and less than or very close to Y). Thus $T'_{ave}$<Y and the program of FIG. 2 will increase the chassis by ΔS.

(The unlikely event of $T'_{ave}$>Y would simply mean a further reduction in chassis speed. Also those skilled in the art will recognize that the examples in FIGS. 3A and 3B were chosen for purposes of illustration and that successive identical or nearly identical runs of mailpieces causing oscillation are not of significant concern.)

It will be apparent to those skilled in the art that comparison of $T_{ave}$ is an indirect measure of the fraction of empty cycles in a sample. $T_{ave}$<Y implies few or no dry holes, while a substantial number of dry holes implies $T_{ave}$ >Y. In other embodiments of the subject invention the fraction of empty cycles can be directly measured for each sample and the chassis speed increased or decreased depending upon whether the fill rate (i.e. 1−the fraction of empty cycles) is above or below the predetermined optimum, respectively. This optimum will preferably be slightly less than 100% since a 100% fill rate can merely indicate that the system is running much too slowly. The use of the embodiment of FIG. 2 is preferred however because use of $T_{ave}$ as a measure will reduce the impact that a small number of accumulations which fall only slightly outside the window will have.

The embodiments described above and illustrated in the attached drawings have been given by way of example and illustration only. from the teaching of the present application those skilled in the art will readily recognize numerous other embodiments in accordance with the subject invention. Accordingly, limitations on the subject invention are to be found only in the claims set forth below.

What is claimed is:

1. A method for preparing mailpieces, the method comprising the steps of:

a) providing an inserter system comprising a chassis for assembling mailpieces, the chassis operating cyclically with successive accumulations advancing at the end of each cycle, and a document feeder for feeding accumulations of documents to the chassis, the accumulations containing varying numbers of documents;

b) operating the document feeder at a fixed linear speed, whereby accumulations are available for input to the chassis at varying intervals substantially depending upon the number of documents in corresponding accumulations, so that there is a possibility that no accumulation will be available for particular cycles of the chassis;

c) initially operating the chassis at a selected speed;

d) periodically determining a measure of the fraction of the cycles for which one of the accumulations is available and comparing the measure to a selected value; and e) if the comparison indicates that the fraction is too low, decreasing the chassis speed; and f) if the comparison indicates that the fraction is too high, increasing the chassis speed.

2. A method as described in claim 1 wherein the chassis speed is increased or decreased by a predetermined fixed amount.

3. A method as described in claim 2 wherein the fixed amount is a predetermined function of a system parameter.

4. A method as described in claim 1 wherein the measure is the average difference, over a selected number of the cycles, between the time one of the accumulations is input to the chassis and the time the chassis requested input, and the value is a selected time value.

5. A method as described in claim 4 wherein during each of the cycles one of the accumulations can be input to the chassis during a window and the time value is selected to be slightly less than the duration of the window.

6. A method as described in claim 1 wherein the fraction is measured directly.

7. A method as described in claim 6 wherein and the value is a percentage slightly less than 100 percent.

8. An inserter system, comprising:

a) a chassis for assembling mailpieces, the chassis operating cyclically with successive accumulations advancing at the end of each cycle;

b) a document feeder for feeding accumulations of documents to the chassis, the accumulations containing varying numbers of documents;

c) a controller, the controller controlling the inserter system to:

i) operate the document feeder at a fixed linear speed, whereby accumulations are available for input to the chassis at varying intervals substantially depending upon the number of documents in corresponding accumulations, so that there is a possibility that no accumulation will be available for particular cycles of the chassis;

ii) initially operate the chassis at a selected speed;

iii) periodically determine a measure of the fraction of the cycles for which one of the accumulations is available and compare the measure to a selected value; and iv) if the comparison indicates that the fraction is too low, decrease the chassis speed; and v) if the comparison indicates that the fraction is too high, increase the chassis speed.

9. A system as described in claim 8 wherein the chassis speed is increased or decreased by a predetermined fixed amount.

10. A system as described in claim 9 wherein the fixed amount is a predetermined function of a system parameter.

11. A system as described in claim 8 wherein the measure is the average difference, over a selected number of the cycles, between the time one of the accumulations is input to the chassis and the time the chassis requested input, and the value is a selected time value.

12. A method as described in claim 11 wherein during each of the cycles one of the accumulations can be input to the chassis during a window and the time value is selected to be slightly less than the duration of the window.

13. A method as described in claim 8 wherein the fraction is measured directly.

14. A method as described in claim 13 wherein and the value is a percentage slightly less than 100 percent.

* * * * *